(12) United States Patent
Roske et al.

(10) Patent No.: US 11,578,794 B2
(45) Date of Patent: Feb. 14, 2023

(54) DEVICE FOR COOLING AND LUBRICATING COMPONENTS OF A VEHICLE AND DRIVE DEVICE HAVING A DEVICE OF THIS TYPE

(71) Applicant: ZF Friedrichshafen AG, Friedrichshafen (DE)

(72) Inventors: Michael Roske, Friedrichshafen (DE); Sabine Sielemann, Deggenhausertal (DE); Eckhardt Lübke, Friedrichshafen (DE); Stephan Scharr, Friedrichshafen (DE); Danny Grusser, Tettnang (DE); Wolfgang Rieger, Friedrichshafen (DE); Ulrich Kehr, Tettnang (DE); Timo Wehlen, Friedrichshafen (DE); Andreas Hölscher, Uhldingen-Mühlhofen (DE); Martin Jelinewski, Nonnenhorn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/563,563

(22) Filed: Dec. 28, 2021

(65) Prior Publication Data
US 2022/0221046 A1 Jul. 14, 2022

(30) Foreign Application Priority Data
Jan. 14, 2021 (DE) ...................... 10 2021 200 276.5

(51) Int. Cl.
*F16H 57/04* (2010.01)
*B60K 1/00* (2006.01)
(Continued)

(52) U.S. Cl.
CPC ....... *F16H 57/0415* (2013.01); *F16H 57/021* (2013.01); *F16H 57/037* (2013.01);
(Continued)

(58) Field of Classification Search
CPC .............. F16H 57/0415; F16H 57/021; F16H 57/037; F16H 57/0404; F16H 57/043;
(Continued)

(56) References Cited

U.S. PATENT DOCUMENTS

2002/0134183 A1* 9/2002 Ishii .................... F16H 57/0415
74/352
2009/0230791 A1* 9/2009 Scharfenberg ........... H02K 9/02
310/112
(Continued)

FOREIGN PATENT DOCUMENTS

DE 102017203527 A1 9/2018
EP 3708796 A1 9/2020
(Continued)

OTHER PUBLICATIONS

German Office Action DE 10 2021 200 276.5, dated Aug. 5, 2021. (12 pages).

*Primary Examiner* — Colby M Hansen
(74) *Attorney, Agent, or Firm* — Dority & Manning, P.A.

(57) ABSTRACT

A device (1) for cooling and lubricating components of a vehicle (2) may include a housing (3), a coolant sump (4), a coolant pump (5) for pumping coolant (6) from the coolant sump (4), a heat exchanger (7) for cooling coolant (6) from the coolant pump (5), and a coolant line system (8) including a coolant reservoir (9) having a single coolant inlet (10) and multiple coolant outlets (11.1, 11.2, 11.3, 11.4, 11.5). The coolant line system (8) fluidically connects the coolant pump (5) to the heat exchanger (7), and the heat exchanger (7) to the single coolant inlet (10) of the coolant reservoir (9). The coolant reservoir (9) receives coolant (6) from the heat exchanger (7) via the single coolant inlet (10) and directs coolant (6) via the multiple coolant outlets (11.1, 11.2, 11.3, 11.4, 11.5) onto components in the housing (3) requiring cooling and lubrication.

15 Claims, 2 Drawing Sheets

(51) Int. Cl.
*F16H 57/021* (2012.01)
*F16H 57/037* (2012.01)
*F16H 57/02* (2012.01)

(52) U.S. Cl.
CPC ....... *F16H 57/043* (2013.01); *F16H 57/0404* (2013.01); *F16H 57/046* (2013.01); *F16H 57/0445* (2013.01); *F16H 57/0471* (2013.01); *F16H 57/0476* (2013.01); *F16H 57/0483* (2013.01); *B60K 2001/001* (2013.01); *F16H 57/0436* (2013.01); *F16H 2057/02034* (2013.01); *F16H 2057/02052* (2013.01)

(58) Field of Classification Search
CPC ............... F16H 57/0445; F16H 57/046; F16H 57/0471; F16H 57/0476; F16H 57/0483; F16H 57/0436; F16H 2057/02034; F16H 2057/02052; B60K 2001/001
USPC ........................................................ 475/150
See application file for complete search history.

(56) References Cited

U.S. PATENT DOCUMENTS

| | | |
|---|---|---|
| 2010/0218642 A1* | 9/2010 | Leichsenring ...... F16H 57/0413 74/606 A |
| 2012/0091836 A1 | 4/2012 | Hayashi et al. |
| 2012/0299419 A1 | 11/2012 | Tanaka et al. |
| 2019/0186622 A1 | 6/2019 | Ishikawa et al. |
| 2019/0229582 A1 | 7/2019 | Ito et al. |
| 2019/0291570 A1 | 9/2019 | Tang et al. |
| 2020/0292054 A1 | 9/2020 | Kawanishi et al. |

FOREIGN PATENT DOCUMENTS

| | | |
|---|---|---|
| JP | 2007-247706 A | 9/2007 |
| JP | 2007-321927 A | 12/2007 |
| WO | WO 2020/213508 A1 | 10/2020 |

\* cited by examiner

DEVICE FOR COOLING AND LUBRICATING COMPONENTS OF A VEHICLE AND DRIVE DEVICE HAVING A DEVICE OF THIS TYPE

CROSS-REFERENCE TO RELATED APPLICATION

The present application is related and has right of priority to German Patent Application No. 10 2021 200 276.5 filed on Jan. 14, 2021, the entirety of which is incorporated by reference for all purposes.

FIELD OF THE INVENTION

The invention relates generally to a device for cooling and lubricating components of a vehicle, including a housing. The components of the vehicle requiring cooling and lubrication are arranged in the housing. The invention further relates to a related drive device having an electric prime mover for a vehicle, including a device for cooling and lubricating.

BACKGROUND

Effective cooling of an electric machine is necessary so that the electric machine for driving a vehicle is operable at high power levels. Waste heat of the electric machine arising at high power levels is power-limiting for certain applications, for example, electrically driven axles. As soon as the electric machine exceeds a limiting temperature, a control unit of the electric machine typically reduces the power.

For example, DE 10 2017 203 527 A1 discloses a device for cooling and lubricating a transmission for a vehicle, including a transmission housing and at least one input pinion in the transmission housing rotatable about a first axis of rotation, and an output gearwheel rotatable about a second axis of rotation, the second axis of rotation being arranged in parallel to the first axis of rotation, and a collection element. The collection element is mounted at the transmission housing in the area of an opening area, which is located at the transmission housing, wherein the output gearwheel is brought into contact with a fluid for cooling and lubrication. The collection element includes a projection element, wherein the projection element is directed toward an outer circumference of the output gearwheel. During a rotation of the output gearwheel, the outflowing fluid is directed into the collection element via the projection element.

SUMMARY OF THE INVENTION

The present invention provides a device for cooling and lubricating components of a vehicle and a drive device for a vehicle having improved cooling. In particular, the device is easy to install.

A device according to the invention for cooling and lubricating components of a vehicle includes at least one housing, a coolant sump, a coolant pump configured for delivering coolant from the coolant sump, a heat exchanger configured for cooling the coolant delivered by the coolant pump, and a coolant line system including a coolant reservoir. The coolant line system fluidically connects the coolant pump at least to the heat exchanger and fluidically connects the heat exchanger at least to the coolant reservoir. The coolant reservoir includes one single coolant inlet for injecting coolant from the heat exchanger, and multiple coolant outlets for spraying coolant from the coolant reservoir onto components in the housing requiring cooling and lubrication.

In other words, the device according to the invention is utilized for cooling and lubricating the components of the vehicle arranged in the housing. In particular, the coolant circuit is closed within the housing, so that no coolant gets out. The coolant is, in particular, cooling liquid which is, for example, oil-based or water-based. For example, the coolant is transmission oil, motor oil, or similar oil for vehicle components. The coolant is provided for absorbing and dissipating heat and for lubricating parts and/or components so that they interact with low wear.

The coolant is delivered from the coolant sump to the coolant reservoir by the coolant pump via the coolant line system and the heat exchanger. The coolant reservoir is utilized for distributing the coolant onto multiple, in particular onto all, components of the vehicle requiring cooling and lubrication that are arranged within the housing of the device. From the components cooled and lubricated by coolant, the coolant flows into the coolant sump in the housing. The coolant sump is to be understood as a collection point for the coolant in the housing. For example, a coolant container is arranged in the housing and is configured for accommodating the coolant sump and as a collection point for the coolant in the housing. The coolant pump delivers the coolant from the coolant sump and the coolant container through the coolant circuit at least indirectly via further components, lines, or openings. For example, the housing of the device is in one piece or two pieces.

In particular, a single coolant reservoir is provided in the housing of the device. The coolant reservoir is preferably monolithic and includes the single coolant inlet and the plurality of coolant outlets. For example, the coolant reservoir is part of a type of "common rail", which is also known as accumulator injector with respect to internal combustion engines, in particular diesel engines. For example, the coolant pump is a high pressure pump, which delivers the coolant, in a pressurized manner, into the coolant reservoir. Preferably, the pressure level in the coolant reservoir is variably adjustable. For example, the coolant inlet is axially central or centered in the coolant reservoir. Alternatively, the coolant inlet is on one side at one of the two end sections of the coolant reservoir. Due to the provision of the coolant reservoir with a single coolant inlet for injecting coolant as well as multiple coolant outlets for spraying coolant onto multiple, in particular onto all, components in the housing of the device requiring cooling and lubrication, not only is an improved cooling created, but rather the ease of installation of the device is also increased.

Unless indicated in greater detail, a fluidic connection is implemented by fluid-conveying means, in particular ducts, lines, pipes, and/or hoses, which are configured for guiding the coolant.

According to one preferred embodiment of the invention, at least the coolant line system and the coolant reservoir are integrated in the housing. An integration of the coolant line system and of the coolant reservoir in the housing of the device is understood to mean that the coolant line system and the coolant reservoir are indirectly or directly arranged in or at the housing. For example, the coolant line system and the coolant reservoir are indentations in walls of the housing in order to reduce the number of components and the installation effort of the device. For example, the coolant line system and the coolant reservoir are ducts, pipes, lines, and/or hoses in or at walls of the housing. Preferably, the heat exchanger and/or the coolant pump are/is also integrated in the housing of the device. The integration of at least the coolant line system and the coolant reservoir in the housing increases the ease of installation of the device.

According to one preferred embodiment of the invention, the housing has at least one first housing section for accommodating a transmission and one second housing section for accommodating an electric machine including a stator and a rotor. Therefore, the transmission is arranged in the first housing section, wherein the electric machine including the stator and the rotor is arranged in the second housing section. A housing section is to be understood as an essentially closed cavity within the housing, wherein the housing sections are separated from one another by housing walls. For example, openings or similar passages for coolant are arranged in the walls in order to implement a flow of coolant between the essentially closed housing sections. The spatial separation between the transmission and the electric machine enables an improved and more demand-oriented adjustment of the coolant supply and atmosphere in the particular housing section.

According to one preferred embodiment of the invention, the housing includes a third housing section, wherein coolant flows from the first housing section and from the second housing section, via openings provided therefor, into the third housing section in order to form the coolant sump in the third housing section. In other words, the openings in the particular housing walls are utilized for routing coolant from the first and second housing sections into the third housing section, where the coolant sump is arranged. The arrangement of the coolant sump in another housing section separated from the transmission and the electric machine enables a stabilized coolant sump, in particular having a smaller portion of air and/or foam in the coolant.

According to one preferred embodiment of the invention, at least one coolant filter is arranged in the third housing section, wherein the at least one coolant filter is fluidically connected to the coolant pump. The coolant filter is configured, in particular, for filtering dirt particles, foreign objects, and/or foreign fluids out of the coolant in order to maintain a high quality of the coolant for as long as possible and extend maintenance intervals of the device.

According to one preferred embodiment of the invention, a wall of the housing between the first housing section and the second housing section accommodates at least one bearing element, wherein the at least one bearing element is configured for routing coolant between the first housing section and the second housing section. In other words, a coolant flow between the first housing section and the second housing section is implemented via the at least one bearing element in the wall of the housing. For example, the at least one bearing element conveys coolant from the first housing section into second housing section, or vice versa, due to rotation during a driving operation of the vehicle. This advantageously contributes to the coolant distribution and to the coolant mixing in the housing.

According to one preferred embodiment of the invention, the housing includes a fourth housing section for accommodating at least the coolant line system and the coolant reservoir, wherein the fourth housing section extends at least partially along the first, second, and third housing sections. Consequently, at least the coolant line system and the coolant reservoir are arranged in the fourth housing section, and so these are spatially separated from the transmission and from the electric machine. As a result, an ease of installation of the device is improved. In particular, the coolant pump and the heat exchanger are also arranged in the fourth housing section. The integration of coolant pump, heat exchanger, coolant line system, and coolant reservoir in the fourth housing section further increases the ease of installation of the device. In particular, this integration promotes a modular configuration of the housing. For example, the fourth housing section abuts the first housing section with at least one wall. For example, the fourth housing section abuts the second housing section with at least one wall, preferably with two walls. For example, the fourth housing section abuts the third housing section with at least one wall.

According to one preferred embodiment of the invention, at least one first coolant outlet is configured for spraying coolant onto stator windings of the stator, wherein the at least one first coolant outlet is fluidically connected to multiple first spray nozzles, which are configured for being arranged at least partially circumferentially around the stator windings. A spray nozzle is to be understood as an opening, through which coolant is sprayed in a targeted and, thereby, controlled manner onto components in the housing requiring cooling and lubrication. In the present case, the first spray nozzles spray the coolant in a targeted and, thereby, controlled manner onto the stator windings and/or winding overhangs of the stator. Due to the direct wetting of the surfaces of the stator windings, the cooling potential for the electric machine increases considerably. This is the case because a direct and immediate cooling takes place at the spot of the heat development, namely at the stator windings. For example, at least three first spray nozzles are arranged in the radial or tangential direction circumferentially around each of the two stator windings. In particular, so many first spray nozzles are arranged in the radial or tangential direction circumferentially around each of the two stator windings that a complete wetting of the two stator windings with coolant is achieved. Moreover, a partial wetting of an upper half of the stator windings is also conceivable, wherein the remainder of the stator windings is also cooled by dripping coolant.

According to one preferred embodiment of the invention, at least one second coolant outlet is configured for spraying coolant onto an outer circumferential surface of the stator, wherein the at least one second coolant outlet is fluidically connected to multiple second spray nozzles, which are configured for being arranged in the longitudinal direction of the stator. Consequently, coolant flows via the at least one second coolant outlet and the second spray nozzles in a targeted and, thereby, controlled manner onto the outer circumferential surface, i.e., the lateral surface of the stator, in particular onto the laminations of the stator. Due to the direct wetting of the outer circumferential surface of the stator, the cooling potential for the electric machine increases considerably. This is the case because a direct and immediate heat dissipation takes place via the coolant at the outer circumferential surface of the stator. For example, at least three second spray nozzles are arranged in the axial direction, i.e., along a longitudinal axis of the stator. For example, multiple rows of spray nozzles are arranged in the circumferential direction around the stator. In particular, so many second spray nozzles are arranged in the tangential direction circumferentially around the stator windings that a complete wetting of the outer circumferential surface of the stator with coolant is achieved.

Preferably, the particular spray nozzle has an orifice. An orifice is to be understood as an element that at least partially closes the particular spray nozzle or opening and/or changes its cross-section in such a way that the flow rate and, in particular, also a spray direction and a shape of the spray jet are adjusted. In addition to the flow rate, the orifice also adjusts a pressure of the coolant in the coolant reservoir. Moreover, a suction effect for the coolant is adjustable via orifices at the spray nozzles in such a way that a constant flow resistance is set regardless of the number of spray nozzles that are connected to the particular coolant outlet of the coolant reservoir. Preferably, all spray nozzles are supplied with an identical pressure level.

According to one preferred embodiment of the invention, at least one third coolant outlet is configured for spraying coolant onto at least one teeth-meshing area of gearwheels. As a result, the teeth-meshing area of gearwheels is immediately and advantageously lubricated. In particular, the gearwheels are arranged in the first housing section and are part of the transmission. For example, a first gearwheel is rotationally fixed to the rotor shaft of the electric machine, wherein a second gearwheel is rotationally fixed to a component of a differential gear, in particular to a differential cage or a planet carrier. In the teeth-meshing area, two gearwheels engage with one another in order to transmit a rotational speed and a torque from the one gearwheel onto the other gearwheel.

According to one preferred embodiment of the invention, at least one fourth coolant outlet is configured for spraying coolant onto at least one bearing element. As a result, the at least one bearing element is immediately and advantageously lubricated. For example, the at least one bearing element is configured for the rotatable mounting of the rotor shaft. Preferably, the at least one bearing element is a cylindrical roller bearing or a ball bearing.

According to one preferred embodiment of the invention, at least one fifth coolant outlet is configured for spraying coolant into at least one first pan. A pan is to be understood as a catch basin for coolant, and so the coolant accumulates in the pan. For example, the at least one first pan has an opening in order to allow coolant to pass through to a further bearing or other components in the housing that require cooling and lubrication. In particular, the at least one first pan is configured for providing coolant for a bearing element, and so the bearing element draws coolant from the at least one first pan, depending on the load and in particular depending on the rotational speed, and, thereby, supplies itself. For example, the coolant is routed from the at least one first pan via the bearing element between two housing sections.

A drive device for a vehicle includes a device according to the invention, including a housing, an electric machine having a stator and a rotor, and a transmission, wherein a rotor shaft of the electric machine is drivingly connected to the transmission via at least one gear stage, wherein the transmission is a differential gear and has a first output shaft and a second output shaft, wherein the two output shafts are arranged axially parallel to the rotor shaft.

In other words, the drive device is arranged in the housing of the device for cooling and lubricating the components of the vehicle, in particular for cooling and lubricating the transmission and the electric machine, which is provided as the prime mover for the vehicle. The electric machine is utilized either alone or in combination with a further electric machine or an internal combustion engine for driving the vehicle. For example, the electric machine is configured for driving an axle of the vehicle. For example, the vehicle is a motor vehicle. The two output shafts of the differential gear are each at least indirectly connected to at least one wheel of the vehicle. The output shafts are arranged coaxially to an output axis.

Preferably, the differential gear is a bevel gear differential. Moreover, other alternative embodiments of the differential are also conceivable, for example, as a spur gear differential or a planetary differential. The drive power coming from the electric machine via the gear stage is transmitted onto the two output shafts via the differential gear, wherein the differential gear distributes the drive power, i.e., a rotational speed and a torque, onto the two output shafts. The differential is also arranged on the output axis so that the output shafts are situated coaxially on the output axis.

A differential gear as a bevel gear differential includes two wheel-side output elements, in particular a first output gear and a second output gear. The two output gears each mesh with a compensating element. The compensating elements are mounted, rotatable about their own axes, in a differential cage. The particular output gear is rotationally fixed to the particular output shaft. The drive of the differential takes place via the differential cage. In particular, a large gearwheel is rotationally fixed to the differential cage and intermeshes with a gearwheel, which is small by comparison thereto and is rotationally fixed to the rotor shaft. The large gearwheel and the small gearwheel form the gear stage, wherein a ratio is set at least as a function of the numbers of teeth of the two gearwheels.

The electric machine includes the rotatable rotor and the housing-affixed stator and is operable as a motor or as a generator. When the electric machine is operated as a motor, a voltage, particularly a time-varying voltage, is applied to the stator and to the windings located therein in order to generate a time-varying magnetic field, which acts in the rotor to induce a torque and, thereby, generate a turning motion. When the electric machine is operated as a generator, for example, electrical energy is generated by inducing a changing magnetic field, for example, by rotating the rotor, in a looped or coiled conductor of the stator, in order to induce a current in the conductor. The electrical energy generated in the generator mode is storable in a battery. In the motor mode, the electrical energy of the electric machine is supplied from the battery in order to drive the vehicle.

According to one preferred embodiment of the invention, the rotor shaft is rotatably mounted in the housing via a first bearing element, a second bearing element, and a third bearing element, wherein the first bearing element is arranged, together with the transmission, in a first housing section, wherein the second bearing element is arranged, together with the electric machine, in a second housing section, and wherein the third bearing element is arranged in a wall of the housing between the first housing section and the second housing section. In particular, the third bearing element is utilized for routing the coolant between the first housing section and the second housing section. For example, the first bearing element is a cylindrical roller bearing. For example, the second and third bearing elements are ball bearings. The spatial separation between the transmission and the electric machine enables an improved and more demand-oriented adjustment of the coolant supply and atmosphere in the particular housing section.

According to one preferred embodiment of the invention, the first output shaft is rotatably mounted in the housing via a fourth bearing element, wherein the second output shaft is rotatably mounted in the housing via a fifth bearing element and a sixth bearing element, wherein the fourth bearing element is arranged, together with the transmission, in the first housing section, wherein the fifth bearing element is arranged, together with the electric machine, in the second housing section, and wherein the sixth bearing element is arranged in the wall of the housing between the first housing section and the second housing section. In particular, the sixth bearing element is utilized for routing the coolant between the first housing section and the second housing section. For example, the second bearing element is a ball bearing. For example, the first and third bearing elements are tapered roller bearings. The spatial separation between the transmission and the electric machine enables an improved and more demand-oriented adjustment of the coolant supply and atmosphere in the particular housing section.

BRIEF DESCRIPTION OF THE DRAWINGS

A preferred embodiment of the invention is explained in greater detail in the following with reference to the drawings, wherein identical elements are labeled with the same reference character, wherein.

DETAILED DESCRIPTION

Figure 1:
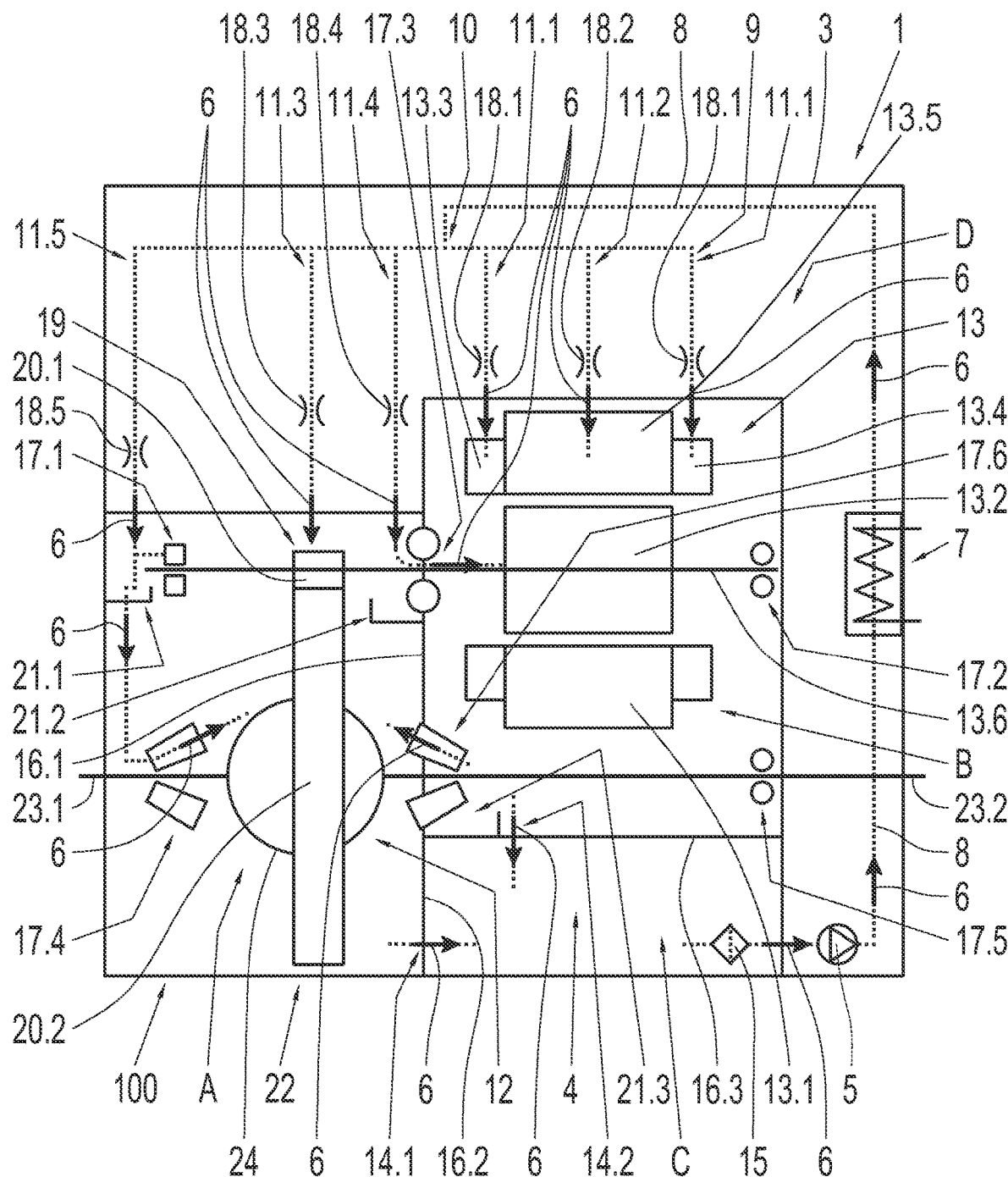
FIG. 1 shows a highly simplified diagrammatic section view of a drive device according to the invention including a device according to the invention for cooling and lubricating components in a housing.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

According to FIG. 1, a drive device 100 according to the invention for a vehicle 2 (FIG. 4) includes a device 1 for cooling and lubricating components of the vehicle 2 that are arranged in a housing 3 of the device 1. In the present case, an electric machine 13 including a stator 13.1 and a rotor 13.2, and a transmission 12 are arranged in the housing 3, wherein a rotor shaft 13.6 of the electric machine 13 is drivingly connected to the transmission 12 via a gear stage 22. The rotor 13.2 is rotationally fixed to the rotor shaft 13.6. The transmission 12 is a differential gear and includes a first output shaft 23.1 and a second output shaft 23.2. The two output shafts 23.1, 23.2 are arranged axially parallel to the rotor shaft 13.6.

The rotor shaft 13.6 is rotatably mounted in the housing 3 via a first bearing element 17.1, which is a cylindrical roller bearing, a second bearing element 17.2, which is a ball bearing, and a third bearing element 17.3, which is a ball bearing. The first bearing element 17.1 is arranged, together with the transmission 12, in a first housing section A. The second bearing element 17.2 is arranged, together with the electric machine 13, in a second housing section B. The third bearing element 17.3 is arranged in a wall 16.1 of the housing 3 between the first housing section A and the second housing section B. The third bearing element 17.3 is configured for routing coolant 6 between the first housing section A and the second housing section B.

The first output shaft 23.1 is rotatably mounted in the housing 3 via a fourth bearing element 17.4, which is a tapered roller bearing. The second output shaft 23.2 is rotatably mounted in the housing 3 via a fifth bearing element 17.5, which is a ball bearing, and a sixth bearing element 17.6, which is a tapered roller bearing. The fourth bearing element 17.4 is arranged, together with the transmission 12, in the first housing section A. The fifth bearing element 17.5 is arranged, together with the electric machine 13, in the second housing section B. The sixth bearing element 17.6 is arranged in the wall 16.1 of the housing 3 between the first housing section A and the second housing section B and is configured for routing coolant 6 from the second housing section B into the first housing section A. In particular, the routing of coolant 6 from the second housing section B into the first housing section A takes place by way of centrifugal forces via the sixth bearing element 17.6.

Moreover, a coolant sump 4, a coolant filter 15, a coolant pump 5, a heat exchanger 7, and a coolant line system 8 including a coolant reservoir 9 are arranged in the housing 3. The coolant line system 8 fluidically connects the coolant pump 5 to the heat exchanger 7 and fluidically connects the heat exchanger 7 to the coolant reservoir 9. Via the coolant pump 5, coolant 6 is routed from the coolant sump 4 through the coolant filter 15 into the coolant line system 8. The heat exchanger 7 arranged between the coolant pump 5 and the coolant reservoir 9 cools the coolant 6 delivered by the second coolant pump 5. The coolant 6 cooled by the heat exchanger 7 is delivered into the coolant reservoir 9 via the coolant line system 8. The coolant line system 8 and the coolant reservoir 9 are integrated in the housing 3, in the present case as indentations in a fourth housing section D. The coolant reservoir 9 has a single coolant inlet 10, which is configured for injecting coolant 6 from the heat exchanger 7 via the coolant line system 8. Moreover, the coolant reservoir 9 includes multiple coolant outlets 11.1, 11.2, 11.3, 11.4, 11.5, each of which is configured for spraying coolant 6 from the coolant reservoir 9 onto components in the housing 3 that require cooling and lubrication.

In the present case, the housing 3 includes the first housing section A for accommodating the transmission 12. Moreover, the housing 3 includes the second housing section B for accommodating the electric machine 13 having the stator 13.1 and the rotor 13.2. In addition, the housing 3 includes the third housing section C for accommodating the coolant sump 4 and the coolant filter 15. For example, the coolant sump 4 is understood to be a coolant volume of a coolant container arranged in the housing section C. The coolant 6 flows from the first housing section A into the third housing section C through a first opening 14.1, which is provided therefor, in a wall 16.2 between the first and third housing sections A, C in order to form the coolant sump 4 in the third housing section C. Moreover, coolant 6 flows from the second housing section B into the third housing section C through a second opening 14.2, which is provided therefor, in a wall 16.3 between the second and third housing sections B, C in order to form the coolant sump 4 in the third housing section C. The first, second, and third housing sections A, B, C are essentially closed housing cavities and are surrounded by the housing walls. The housing 3 also includes the fourth housing section D for accommodating the coolant line system 8, the coolant reservoir 9, the coolant pump 5, and the heat exchanger 7. The fourth housing section D extends along the first, second, and third housing sections A, B, C and, in fact, in such a way that the coolant line system 8 and the coolant reservoir 9 are arranged outside the first, second, and third housing sections A, B, C. In particular, the housing 3 is formed as multiple pieces and is modular.

Two first coolant outlets 11.1 are configured for spraying coolant 6 onto first and second stator windings 13.3, 13.4 of the stator 13.1, wherein the particular first coolant outlet 11.1 is fluidically connected to particular first spray nozzles 18.1. The stator windings 13.3, 13.4 are arranged at the end-side end surfaces of the stator 13.1 and, there, extend so as to be distributed in the circumferential direction. In the present case, only one first spray nozzle 18.1 for the first stator winding 13.3 and for the second stator winding 13.4 is represented in FIG. 1, for simplicity. As is apparent from FIG. 2, however, the first spray nozzles 18.1 are arranged circumferentially around the stator windings 13.3. As a result, the stator windings 13.3, 13.4 are cooled in a targeted manner.

Figure 2:
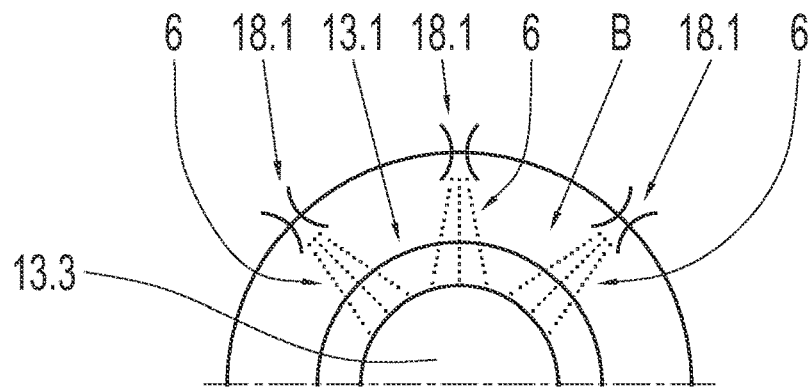
FIG. 2 shows a highly simplified diagrammatic cross-sectional view of a detail of the housing shown in FIG. 1.

According to FIG. 2, the coolant 6 is sprayed via three first spray nozzles 18.1 into the second housing section B onto the stator windings 13.3 of the stator 13.1. In the present case, due to the cross-sectional representation, only the first stator windings 13.3 are represented in a highly simplified manner.

Referring back to FIG. 1, the second coolant outlet 11.2 is configured for spraying coolant 6 onto an outer circumferential surface 13.5 of the stator 13.1, wherein the second coolant outlet 11.2 is fluidically connected to multiple second spray nozzles 18.2. In the present case, only one single second spray nozzle 18.2 is represented, for simplicity. As is apparent from FIG. 3, however, the second spray nozzles 18.2 are arranged in the longitudinal direction of the stator 13.2. As a result, the outer circumferential surface 13.5 of the stator 13.1 is cooled in a targeted manner.

Figure 3:
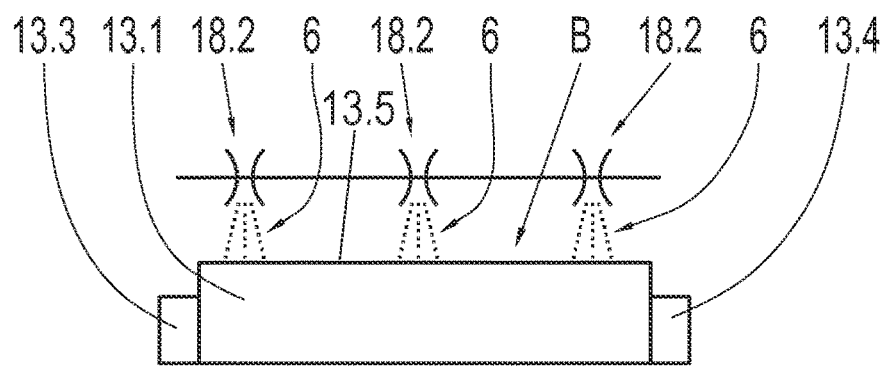
FIG. 3 shows a highly simplified diagrammatic longitudinal sectional view of a detail of the housing shown in FIG. 1.

According to FIG. 3, the coolant 6 is sprayed via three second spray nozzles 18.2 into the second housing section B onto the outer circumferential surface 13.5 of the stator 13.1. The outer circumferential surface 13.5 of the stator 13.1 extends in the axial direction from the first stator windings 13.3 up to the second stator windings 13.4.

Referring again to FIG. 1, the third coolant outlet 11.3 is configured for spraying coolant 6 onto a teeth-meshing area 19 of two gearwheels 20.1, 20.2 of the gear stage 22, wherein the third coolant outlet 11.3 is fluidically connected to multiple third spray nozzles 18.3. In the present case, only one single third spray nozzle 18.3 is represented, for simplicity. The first gearwheel 20.1 is rotationally fixed to the rotor shaft 13.6, wherein the second gearwheel 20.2 has a considerably greater diameter than the first gearwheel 20.1 and is rotationally fixed to a differential cage 24. Via the differential cage 24, the transmitted drive power is introduced into the differential gear and distributed onto the two output shafts 23.1, 23.2 of the differential gear.

The fourth coolant outlet 11.4 is configured for spraying coolant 6 onto the third bearing element 17.3, wherein the fourth coolant outlet 11.4 is fluidically connected to multiple fourth spray nozzles 18.4. In the present case, only one single fourth spray nozzle 18.4 is represented, for simplicity.

The fifth coolant outlet 11.5 is configured for spraying coolant 6 into a first pan 21.1, which is arranged next to the first bearing element 17.1, wherein the fifth coolant outlet 11.5 is fluidically connected to multiple fifth spray nozzles 18.5. In the present case, only one single fifth spray nozzle 18.5 is represented, for simplicity. The first pan 21.1 is permeable for coolant 6, and so the coolant 6 flows from the first pan 21.1, on the one hand, to the fourth bearing element 17.4 and, on the other hand, to the first bearing element 17.1. A second pan 21.2 is arranged at the third bearing element 17.3, wherein the coolant 6 flows either directly out of the fourth spray nozzles 18.4 into the third bearing element 17.3 or via the second pan 21.2 into the third bearing element 17.3. Through the third bearing element 17.3, the coolant 6 flows from the first housing section A into the second housing section B.

Figure 4:
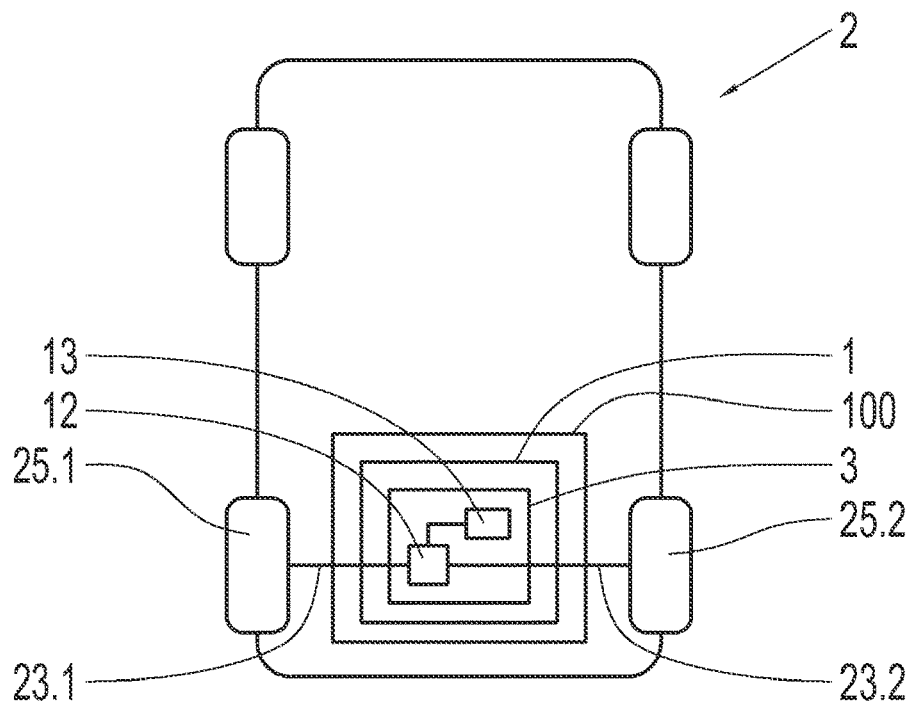
FIG. 4 shows a schematic view of a vehicle including the drive device shown in FIG. 1 according to the invention.

FIG. 4 shows an electrically driven vehicle 2 including the drive device 100 according to the invention, according to FIG. 1. The drive device 100 includes the device 1 according to the invention for cooling and lubricating components of the vehicle 2, wherein the components of the vehicle 2 requiring lubrication and cooling are arranged within the housing 3 of the device 1. Components of the vehicle 2 are to be understood, at least, as the electric machine 13, which generates a drive power and introduces this into the transmission 12, and the transmission 12, which is a differential gear. The transmission 12, which is a differential gear, splits the drive power onto the first output shaft 23.1 and the second output shaft 23.2. Each output shaft 23.1, 23.2 is connected to a wheel 25.1, 25.2, respectively, of the vehicle 2 for driving. The vehicle 2 also includes an energy accumulator (not represented here), which is supplied by the electric machine 13 with electrical energy in the reverse power flow, in the generator mode. The energy accumulator, for example, a battery, or the like. Consequently, via the electric machine 13, in the generator mode, electrical energy is generated, stored, and reserved for a re-supply of the electric machine 3 in a motor mode.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 device
2 vehicle
3 housing
4 coolant sump
5 coolant pump
6 coolant
7 heat exchanger
8 coolant line system
9 coolant reservoir
10 coolant inlet
11.1 first coolant outlet
11.2 second coolant outlet
11.3 third coolant outlet
11.4 fourth coolant outlet
11.5 fifth coolant outlet
12 transmission
13 electric machine
13.1 stator
13.2 rotor
13.3 first stator windings
13.4 second stator windings
13.5 outer circumferential surface of the stator
13.6 rotor shaft
14.1 first opening
14.2 second opening 15 coolant filter
16.1 wall between the first and second housing sections
16.2 wall between the first and third housing sections
16.3 wall between the second and third housing sections
17.1 first bearing element
17.2 second bearing element
17.3 third bearing element
17.4 fourth bearing element
17.5 fifth bearing element
17.6 sixth bearing element
18.1 first spray nozzle
18.2 second spray nozzle
18.3 third spray nozzle
18.4 fourth spray nozzle
18.5 fifth spray nozzle
19 teeth-meshing area
20.1 first gearwheel
20.2 second gearwheel
21.1 first pan
21.2 second pan
21.3 third pan
22 gear stage
23.1 first output shaft
23.2 second output shaft
24 differential cage
25.1 wheel
25.2 wheel
100 drive device
A first housing section
B second housing section
C third housing section
D fourth housing section

The invention claimed is:

1. A device (1) for cooling and lubricating components of a vehicle (2), the device (1) comprising:
   a housing (3);
   a coolant sump (4);
   a coolant pump (5) for pumping coolant (6) from the coolant sump (4);
   a heat exchanger (7) for cooling coolant (6) from the coolant pump (5); and
   a coolant line system (8) including a coolant reservoir (9), the coolant reservoir (9) including a single coolant inlet (10) and multiple coolant outlets (11.1, 11.2, 11.3, 11.4, 11.5), the coolant line system (8) fluidically connecting the coolant pump (5) to the heat exchanger (7) and fluidically connecting the heat exchanger (7) to the single coolant inlet (10) of the coolant reservoir (9),
   wherein the coolant reservoir (9) receives coolant (6) from the heat exchanger (7) via the single coolant inlet (10) and directs coolant (6) via the multiple coolant outlets (11.1, 11.2, 11.3, 11.4, 11.5) onto components in the housing (3) requiring cooling and lubrication.

2. The device (1) of claim 1, wherein the coolant line system (8) and the coolant reservoir (9) are integrated into the housing (3).

3. The device (1) of claim 1, wherein the housing (3) includes a first housing section (A) and a second housing section (B), a transmission (12) being received in the first housing section (A), an electric machine (13) being received in the second housing section (B), the electric machine (13) having a stator (13.1) and a rotor (13.2).

4. The device (1) of claim 3, wherein the housing (3) further includes a third housing section (C) defining the coolant sump (4), wherein coolant (6) flows from the first and second housing sections (A, B) via respective openings (14.1, 14.2) into the coolant sump (4).

5. The device (1) of claim 4, further comprising a coolant filter (15) in the third housing section (C), wherein the coolant filter (15) is fluidically connected to the coolant pump (5).

6. The device (1) of claim 4, wherein the housing (3) further includes a fourth housing section (D), the coolant line system (8) and the coolant reservoir (9) being received in the fourth housing section (D), the fourth housing section (D) extending at least partially along the first, second, and third housing sections (A, B, C).

7. The device (1) of claim 3, further comprising at least one bearing element (17.3, 17.6) in a wall (16.1) of the housing (3) between the first housing section (A) and the second housing section (B), coolant (6) being routable via the at least one bearing element (17.3, 17.6) between the first housing section (A) and the second housing section (B).

8. The device (1) of claim 3, wherein the components in the housing (3) requiring cooling and lubrication includes stator windings (13.3, 13.4) of the stator (13.1), at least one first coolant outlet (11.1) of the multiple coolant outlets (11.1, 11.2, 11.3, 11.4, 11.5) directing coolant (6) onto at least one of the stator windings (13.3, 13.4), each of the at least one first coolant outlet (11.1) being fluidically connected to multiple first spray nozzles (18.1) arranged at least partially circumferentially around the at least one of the stator windings (13.3, 13.4).

9. The device (1) of claim 3, wherein the components in the housing (3) requiring cooling and lubrication includes an outer circumferential surface (13.5) of the stator (13.1), at least one second coolant outlet (11.2) of the multiple coolant outlets (11.1, 11.2, 11.3, 11.4, 11.5) directing coolant (6) onto the outer circumferential surface (13.5) of the stator (13.1), wherein each of the at least one second coolant outlet (11.2) is fluidically connected to multiple second spray nozzles (18.2) arranged in a longitudinal direction of the stator (13.2).

10. The device (1) of claim 1, wherein the components in the housing (3) requiring cooling and lubrication includes at least one teeth-meshing area (19) of gearwheels (20.1, 20.2), at least one third coolant outlet (11.3) of the multiple coolant outlets (11.1, 11.2, 11.3, 11.4, 11.5) directing coolant (6) onto the at least one teeth-meshing area (19) of the gearwheels (20.1, 20.2).

11. The device (1) of claim 1, wherein the components in the housing (3) requiring cooling and lubrication includes at least one bearing element (17.3), at least one fourth coolant outlet (11.4) of the multiple coolant outlets (11.1, 11.2, 11.3, 11.4, 11.5) directing coolant (6) onto the at least one bearing element (17.3).

12. The device (1) of claim 1, wherein the components in the housing (3) requiring cooling and lubrication includes at least one first pan (21.1), at least one fifth coolant outlet (11.5) of the multiple coolant outlets (11.1, 11.2, 11.3, 11.4, 11.5) directing coolant (6) into the at least one first pan (21.1).

13. A drive device (100) for a vehicle (2), the drive device (100) comprising:
   the device (1) of claim 1;
   an electric machine (13) having a stator (13.1) and a rotor (13.2), the rotor (13.2) having a rotor shaft (13.6); and
   a transmission (12),
   wherein the rotor shaft (13.6) of the electric machine (13) is drivingly connected to the transmission (12) via at least one gear stage (22), and
   wherein the transmission (12) is a differential gear including a first output shaft (23.1) and a second output shaft (23.2), the first and second output shafts (23.1, 23.2) being axially parallel to the rotor shaft (13.6).

14. The drive device (100) of claim 13, further comprising a first bearing element (17.1), a second bearing element (17.2), and a third bearing element (17.3),
- wherein the rotor shaft (13.6) is rotatably mounted in the housing (3) via the first, second, and third bearing elements (17.1, 17.2, 17.3),
- wherein the first bearing element (17.1) and the transmission (12) are in a first housing section (A) of the housing (3),
- wherein the second bearing element (17.2) and the electric machine (13) are in a second housing section (B) of the housing (3), and
- wherein the third bearing element (17.3) is received in a wall (16.1) of the housing (3) between the first and second housing sections (A, B).

15. The drive device (100) of claim 13, further comprising a fourth bearing element (17.4), a fifth bearing element (17.5), and a sixth bearing element (17.6),
- wherein the first output shaft (23.1) is rotatably mounted in the housing (3) via the fourth bearing element (17.4),
- wherein the second output shaft (23.2) is rotatably mounted in the housing (3) via the fifth and sixth bearing elements (17.5, 17.6),
- wherein the fourth bearing element (17.4) and the transmission (12) are in a first housing section (A) of the housing (3),
- wherein the fifth bearing element (17.5) and the electric machine (13) are in a second housing section (B) of the housing (3), and
- wherein the sixth bearing element (17.6) is received in a wall (16.1) of the housing (3) between the first and second housing sections (A, B).

* * * * *